United States Patent
Berg et al.

(10) Patent No.: US 9,971,621 B1
(45) Date of Patent: May 15, 2018

(54) HOTPOOLING VIRTUAL MACHINES

(71) Applicant: Amazon Technologies, Inc., Seattle, WA (US)

(72) Inventors: Paul William Berg, Seattle, WA (US); Paul James Canup, Seattle, WA (US); William Thomas Chappell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/612,026

(22) Filed: Feb. 2, 2015

(51) Int. Cl.
   *G06F 9/455* (2018.01)

(52) U.S. Cl.
   CPC .. *G06F 9/45558* (2013.01); *G06F 2009/4557* (2013.01)

(58) Field of Classification Search
   CPC .. G06F 9/45558; G06F 9/455; G06F 9/45533; G06F 2009/45562; G06F 2009/4557; G06F 2009/45575; G06F 2009/45591
   USPC .......................................................... 718/1
   See application file for complete search history.

(56) References Cited

U.S. PATENT DOCUMENTS

| | | | |
|---|---|---|---|
| 7,664,913 B2 * | 2/2010 | Cassell | G06F 3/0605 711/114 |
| 8,700,946 B2 * | 4/2014 | Reddy | G06F 11/2041 714/4.11 |
| 8,701,109 B1 | 4/2014 | Lazier | |
| 8,788,379 B1 | 7/2014 | Sirota et al. | |
| 8,856,339 B2 * | 10/2014 | Mestery | H04L 67/10 709/226 |
| 8,930,948 B2 * | 1/2015 | Shanmuganathan | G06F 9/4856 718/1 |

(Continued)

FOREIGN PATENT DOCUMENTS

WO   WO 2014047073 A1 *   3/2014 ............. G06F 9/505

OTHER PUBLICATIONS

Borgetto, Damien; Maurer, Michael; Da-Costa, Georges; Pierson, Jean-Marc; and Brandic, Ivona, "Energy-efficient and SLA-Aware Management of IaaS Clouds," 2012 Third International Conference on Future Energy Systems: Where Energy, Computing and Communication Meet, May 9-11, 2012, 10 pp.*

(Continued)

*Primary Examiner* — Andrew M Lyons
(74) *Attorney, Agent, or Firm* — Patterson + Sheridan, LLP

(57) ABSTRACT

The number of compute resource required by a user in a computing environment may change dynamically. For example, the virtual machine instances allocated to a particular user may host a web service. As queries to the web service increase, the current number of allocated virtual machine instances may be insufficient to provide timely responses. In response to the increased demand, the computing environment may increase the number of instances allocated to the user. To do so, the computing environment maintains one or more already executing virtual machine instances in a hotpool that have not been assigned to any user. When a user needs additional computing resources, one or more of the virtual machine instances in the hotpool may be allocated to the users. Because these instances are already executing, the computing environment avoids the relatively long delay corresponding to generating a new virtual machine instance.

21 Claims, 7 Drawing Sheets

(56) References Cited

U.S. PATENT DOCUMENTS

| | | | | |
|---|---|---|---|---|
| 8,959,389 B2* | 2/2015 | Kulkarni | ............ | G06F 11/2094 714/6.22 |
| 9,507,612 B1* | 11/2016 | Henry | ................... | G06F 9/5027 |
| 9,571,374 B2* | 2/2017 | Ashok | ..................... | H04L 67/10 |
| 9,678,773 B1* | 6/2017 | Wagner | ............... | G06F 9/45533 |
| 2011/0078303 A1* | 3/2011 | Li | ......................... | G06F 9/505 709/224 |
| 2011/0213686 A1* | 9/2011 | Ferris | ..................... | G06F 9/505 705/34 |
| 2012/0174096 A1* | 7/2012 | Conover | ............ | G06F 9/45558 718/1 |
| 2012/0233282 A1* | 9/2012 | Voccio | ............... | G06F 9/45558 709/212 |
| 2013/0047160 A1* | 2/2013 | Conover | ................... | G06F 8/65 718/1 |
| 2013/0054776 A1* | 2/2013 | Kunze | ................... | G06F 9/5061 709/224 |
| 2013/0060919 A1* | 3/2013 | Khandekar | ......... | G06F 9/45558 709/220 |
| 2013/0060946 A1* | 3/2013 | Kenneth | ............ | G06F 12/0866 709/226 |
| 2013/0086585 A1* | 4/2013 | Huang | ................... | G06F 9/5072 718/1 |
| 2013/0111468 A1* | 5/2013 | Davis | .................... | G06F 9/5077 718/1 |
| 2013/0179289 A1* | 7/2013 | Calder | ................... | G06Q 30/08 705/26.3 |
| 2013/0179574 A1* | 7/2013 | Calder | ................... | G06F 9/5033 709/226 |
| 2013/0179895 A1* | 7/2013 | Calder | .................. | G06F 9/5077 718/104 |
| 2013/0239106 A1* | 9/2013 | Srinivasan | .......... | G06F 9/45558 718/1 |
| 2013/0311824 A1* | 11/2013 | Ji | ........................ | G06F 11/1438 714/15 |
| 2014/0082612 A1* | 3/2014 | Breitgand | ............ | G06F 9/45533 718/1 |
| 2014/0201737 A1* | 7/2014 | Mitkar | .................... | G06F 9/485 718/1 |
| 2014/0297868 A1* | 10/2014 | Ennaji | ................... | H04L 47/828 709/226 |
| 2015/0120928 A1* | 4/2015 | Gummaraju | ........ | H04L 67/1008 709/226 |
| 2015/0178107 A1* | 6/2015 | Gummaraju | ........ | G06F 9/45558 718/1 |
| 2015/0378765 A1* | 12/2015 | Singh | ................... | G06F 9/45558 718/1 |

OTHER PUBLICATIONS

Bunch, Chris; Arora, Vaibhav; Chohan, Navraj; Krintz, Chandra; Hegde, Shashank; and Srivastava, Ankit, "A Pluggable Autoscaling Service for Open Cloud PaaS Systems," 2012 IEEE/ACM Fifth International Conference on Utility and Cloud Computing, 2012, pp. 191-194.*

Lloyd, Wes J.; David, Olaf; Arabi, Mazdak; Ascough II, James C.; Green, Thimothy R.; Carlson, Jack R.; and Rojas, Ken W., "The Virtual Machine (VM) Scaler: An Infrastructure Manager Supporting Environmental Modeling on Iaas Clouds" (2014), Institute of Technology Publications, Paper 11.*

* cited by examiner

HOTPOOLING VIRTUAL MACHINES

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers operated by a single organization and public data centers operated by third parties to provide computing resources to customers. Public and private data centers may provide network access, power, hardware resources (e.g., computing and storage), and secure installation facilities for hardware owned by the data center, an organization, or by other customers.

Virtualization technologies may allow a single physical computing machine (e.g., a server) to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least an "as requested" basis.

Virtual machine instances hosted on public data centers (i.e., a cloud computing services provider) are used to provide a variety of computing services, e.g., a website backed by virtual machine instances running web-servers, application servers, and database applications. Because demand for these services varies over time, the customer or service provider may change the number of virtual machines used to provide the service. A significant benefit for an enterprise using public data centers to host virtual machine instances is that the customer can adjust the number of virtual machine instances used (or computing resources provisioned on the virtual machines) to provide the computing services without having to purchase and maintain the underlying physical computing systems.

BRIEF DESCRIPTION OF THE DRAWINGS

Various embodiments in accordance with the present disclosure will be described with reference to the drawings, where like designations denote like elements.

DETAILED DESCRIPTION

Figure 1:
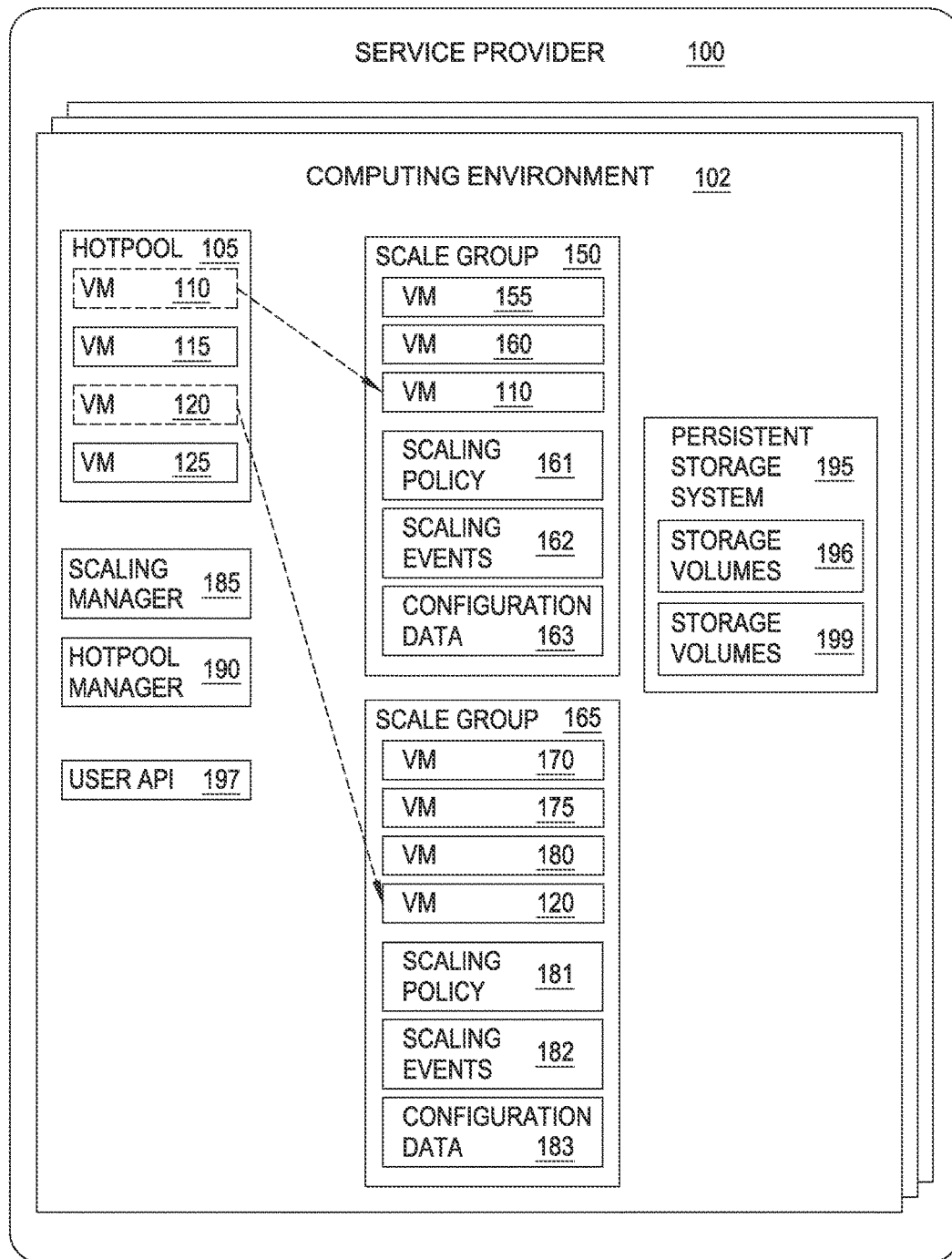
FIG. 1 illustrates a service provider that includes a hotpool of virtual machines, according to various embodiments.

Embodiments presented herein provide techniques for a provider of cloud computing services to rapidly supply clients with additional computing capacity. More specifically, embodiments presented herein provide techniques for maintaining a collection of pre-booted virtual machine (VM) instances—referred to as a pool or hotpool—available to scale individual computing groups of virtual machine instances used by clients to provide applications or services (sometimes referred to as a "fleet" of virtual machines). When a fleet requests additional capacity, rather than configure and boot a new virtual machine instance, the service provider can add one of the pre-booted virtual machine instances available from the hotpool to the fleet. This approach can substantially reduce the time needed for a fleet to react to traffic spikes or other changes in demand, as the time required to boot a new virtual machine instance can take on the order of minutes, during which time current demands may overtax the capacity of the fleet. To add an instance from the hotpool to a given fleet, the provider may mount a storage volume storing applications and data associated with that fleet to an instance from the hotpool and invoke any startup scripts used to configure the instance to be a member of the fleet. In contrast to launching a new virtual machine instance, customizing a booted virtual machine instance from the hotpool may require only a few seconds. Once configured, the virtual machine instance is added to the fleet.

Requests to add (or remove) virtual machine instances to a fleet may be generated automatically or be based on conditions specified for a given fleet. Doing so allows a user to match the number of instances in a fleet to a demand for services provided by that fleet. For example, a condition could specify to add virtual machine instances to a fleet so long as an average CPU utilization for the fleet exceeds a threshold, i.e., to respond to a sustained spike in demand for processing capacity. Conversely, another condition could specify to remove virtual machine instances from the fleet so long as average CPU utilization was below another threshold. More generally, conditions for adding (or removing) virtual machine instances may be based on request frequency, request counts, resource utilization, capacity, or performance of a fleet of virtual machines providing applications or services to clients. Additionally, requests to add (or remove) virtual machine instances to a fleet may be generated according to defined schedules, generated manually, or in response to specific events (e.g., in response to a virtual machine instance in the fleet "crashing" or otherwise becoming non-responsive, or to shift virtual machine instances from one region to another).

In one embodiment, the provider may manage how many virtual machine instances are pre-booted and made available in the hotpool. For example, the provider may use historical demand patterns across all the fleets hosted by the provider to model the demand for virtual machine instances. Based on the expected demand, the provider can determine how many virtual machine instances to launch and make available in the hotpool, as well as determine when to add virtual machine instances to the hotpool. The provider may also adjust the number of instances in the hotpool based an actual demand. For example, when an unexpected demand for instances from the hotpool occurs, the provider could automatically replenish the hotpool with additional virtual machine instances. Conversely, the provider could shut down virtual machine instances in the hotpool if actual demand for the instances from the hotpool falls short of expected demand. Additionally, the provider may determine the number of instances in the hotpool based on a computing environment (e.g., data center, geographic region, availability zones, etc.) hosting the instances. For example, a hotpool assigned to one availability zone (i.e., a group of redundant, computing resources that offer failover capability in the event of power failures or service interruptions occurring in other computing environments) may contain a different number of instances than a hotpool assigned to another availability zone.

Virtual machine instances added to the hotpool may be booted using a specific version of a guest operating system system, e.g., a specific version of a Linux® distribution. Because virtual machine instances in the hotpool are booted using a given version of a guest operating system prior to receiving a request for a virtual machine, user applications need to be structured so as to not depend on changes to the guest operating system made during the boot sequence. Additionally, virtual machine instances may be added to the hotpool to make instances available having distinct instance types or characteristics. For example, the provider may configure virtual machine instances for the hotpool having different CPU, memory, storage, and networking capacity, etc., as well as launch virtual machines optimized for different computing tasks. In one embodiment, a request for a virtual machine instance from the hotpool may specify what guest operating system or what instance type should be used to satisfy the request (or directed to a hotpool of virtual machine instances having that guest operating system or instance type). If the application or service provided by a given fleet requires access to the boot sequence for configuration (or if no instance is available in the hotpool that matches a request), then a new virtual machine instance is booted when that fleet requests additional virtual machines.

In addition to providing a hotpool of virtual machine instances available for customer fleets, the provider may also use instances from the hotpool (or maintain another hotpool of instances) available to add computing capacity to the services offered by that provider. As with the total number of virtual machine instances in the hotpool, the number of instances booted using a particular guest operating system or of a given instance type may be tailored based on expected demand for such instances (as well as subject to minimum or maximum counts).

As noted, the number of virtual machine instances in a fleet which are used to provide a given application or service may be reduced based on conditions specified by a user (e.g., virtual machine instances may be removed from a fleet to increase average CPU utilization in the fleet above a minimum, or virtual machine instances may be removed according to a defined schedule). In one embodiment, when a virtual machine instance is removed from a fleet, that instance may be returned to the hotpool. For example, if the scripts used to configure a virtual machine instance from the hotpool were granted only user-level access, then the virtual machine instance could be returned to the hotpool after simply unmounting the storage volume associated with the fleet, terminating any user processes, and clearing out user-specific data stored in memory. If, however, the configuration scripts were granted system level access (i.e., root privileges) to the guest operating system, in such cases, the virtual machine instance is rebooted before being returned to the hotpool.

Although the present disclosure discusses adding or removing computing resources during scaling events to increase or decrease the virtual machine instances in a fleet, instances from the hotpool may be used to address failover or shifting events where VM instances are added or removed from the fleet. For example, an instance may be pulled from the hotpool to replace a VM that has failed or become nonresponsive. In another example, a VM instance may be pulled from the hotpool to a replace an instance which experiences high latency when communicating with the other VM instances in the fleet (e.g., a shifting event to consolidate virtual machines in the group to a common data center).

FIG. 1 illustrates a computing infrastructure of a service provider 100 (i.e., an infrastructure for a cloud environment), according to various embodiments. As shown, the service provider 100 includes one or more computing environments 102. Although not shown, each computing environment 102 includes a collection of physical computing systems, storage systems, and other hardware and software used to host virtual machine instances, applications, and data for users. In various embodiments, the computing environment 102 may be a physical data center, a cluster of computing systems, a geographic region (e.g., the Southwest region of the United Stated), or an availability zone (i.e., a group of redundant, computing resources that offer failover capability in the event of power failures or service interruptions occurring in other computing environments). In one embodiment, the availability zones may be different groups of computing resources in a data center or region. The availability zones may be isolated from each other such that a failure in one availability zone does not prevent another availability zone from operating.

As shown, the computing infrastructure of service provider 100 includes hotpool 105, scale group 150, scale group 165, scaling manager 185, hotpool manager 190, and persistent storage 195. Hotpool 105 includes a collection of pre-booted VM instances which are available to be added to any scale group (i.e., a fleet of VM instances) hosted by the service provider 100. In one embodiment, the VM instances in hotpool 105 have been booted using a given operating system but are otherwise idle—i.e., VMs in hotpool 105 are not being used to provide computing services for a particular scale group. That is, the VMs may be booted and fully operational but are not currently assigned to perform a task or service in the service provider 100.

The scaling manager 185 and hotpool manager 190 allow the service provider 100 to manage the VM instances in the hotpool 105 and scale groups 150 and 165. The scaling manager 185, for example, detects scaling events requesting to add (or remove) VM instances from one of the scale groups 150 and 165. The hotpool manager 190 manages how many instances are available in the hotpool 105, as well as what instance types or guest operating systems are available from the hotpool 105. FIG. 1 illustrates a scenario where VM instances are added to scale groups 150 and 165. In response to scaling events, scaling manager 185 removes VM instance 110 and VM instance 120 from hotpool 105 and adds these instances to scale groups 150 and 165, respectively (represented in FIG. 1 using ghosted lines). Thus, after the service provider 100 responds to the scaling events, scale group 150 now includes VM instance 110 and scale group 165 includes VM instance 120. After adding VM instances 110 and 120 to groups 150 and 165, hotpool 105 now includes only VM instances 115 and 125. In one embodiment, the hotpool manager 190 may configure and boot additional VM instances to replenish the hotpool 105.

As shown, in addition to including VM instances, scale groups 150 and 165 include a respective scaling policy 161 and 181, scaling event definitions 162 and 182 and configuration data 163 and 183. In one embodiment, the scaling event definitions 162, 182 specify one or more metrics, along with corresponding thresholds, defining scaling events for the scale group. For example, event definitions 162, 182 may define "scale out" events specifying metrics and thresholds used to determine when to increase capacity of the scale group or "scale in" events specifying metrics and thresholds used to determine when to reduce capacity of a scale group. For example, a scale out event could be defined using a threshold for average CPU utilization of VM instances in scale group 165 over a 5 minute time period. Scaling event definitions 162, 182 could also specify a time schedule for scaling VM instances in scale groups 150, 165. Further, computing environment 102 includes an application program interface (API) 197 that allows users to trigger a scaling event regardless of whether a condition in a scaling event 162, 182 is satisfied. Additionally, the computing environment 102 may include other APIs to permit a user to perform other tasks such as defining scaling events, establishing scaling policies, providing parameters for managing the hotpool, configuring the storage volumes, and the like.

When the conditions of a scaling event are satisfied, the scaling policies 161, 181 specify what actions should occur in response to a scaling event. For example, scaling policies 161, 181 may specify a change to a current size of a scale group as an absolute number of VM instances that should be part of the scale group following a scaling event, an increment of VM instances to add or remove from the scale group following a scaling event, or a change to the VM instances in a group based on a percentage of the current group size following a scaling event. When the policies 161, 181 are executed, the scaling manager 185 uses both a current group capacity and the change specified in the scaling policy corresponding to the scale event to compute a new size for the scaling group. That is, the scaling manager 185 evaluates the scaling policies 161, 181 to determine how many VM instances to add (or remove) from a computing group based on a given scaling event.

The configuration data 163 and 183 specify how to configure VM instances added to a scale group. The configuration data 163, 183 may contain scripts(s) containing instructions for preparing a virtual machine instance from the hotpool 105 to provide scalable applications or services as part of the scale group to which the VM instance is being added. For example, the configuration data may identify scripts invoked to define network configurations, mount additional storage volumes, launch user applications, register the VM instance with monitoring and load balancing services, etc., as needed to prepare or otherwise customize a virtual machine from the hotpool 105 to be a member of a scale group.

As just noted, in one embodiment, the scaling manager 185 configures VM instances from the hotpool 105 as needed to be a member of a given scale group based on user-specified configuration data 163, 183 specified by a scale group. To add VM instances to a scale group, the scaling manager 185 may mount a VM instance from the hotpool 105 to a storage volume associated with that scale group. In the example of FIG. 1, scaling manager 185 mounts VM instance 110 to storage volume 196 in the persistent storage system 195 and mounts VM instance 120 to storage volume 199 in the persistent storage system 195. Storage volumes 196 and 199 provide mass storage for applications and data corresponding to scale groups 150 and 165. That is, storage volumes 196 and 199 may be attached to a VM instance, but also persist independently from the life of that VM instance. Additionally, scaling manager 185 may launch scripts specified in the configuration data 163, 183 of a scale group to prepare a VM instance from the hotpool 105 to be a member of scale group 150, 165. In the example of FIG. 1, the scaling manager 185 has configured VM instance 110 as a member of scale group 150 based on configuration data 163 and configured VM instance 120 as a member of scale group 165 based on configuration data 183. Once added to the scale groups 150, 165, the VM instances 110, 120 provide additional computing capacity for the scalable computing service provided by scale groups 150, 165—e.g., providing a web service, archiving data, streaming media content, and the like.

Figure 2:
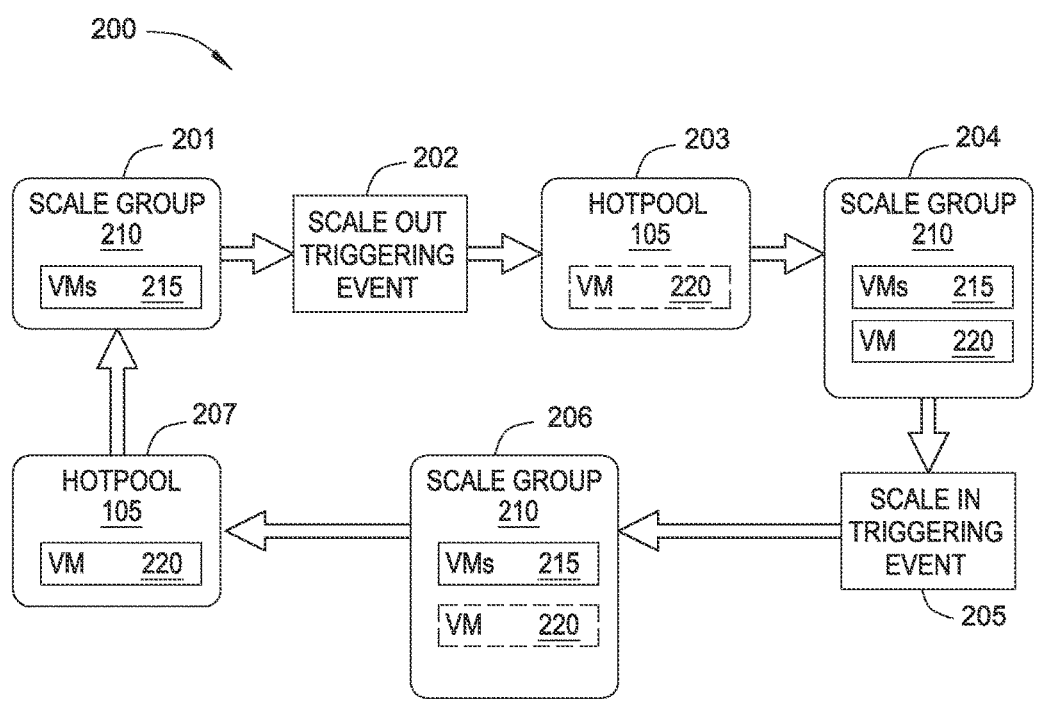
FIG. 2 is a flow chart illustrating a process for scaling computing capacity for a scale group using a hotpool of virtual machines, according to various embodiments.

FIG. 2 is a flow chart 200 for automatically scaling a scale group 210 using VM instances in a hotpool in response to scaling triggering events, according to various embodiments. As shown, block 201 includes scale group 210, which itself includes VM instances 215 that provide a computing service. At block 202, the scaling manager detects a "scale out" event indicating that one or more additional VM instances should be added to scale group 210. In one embodiment, the scaling manager evaluates user-specified metrics of each VM instance in scale group 210 to determine when to trigger a scale out event. As noted, the metrics and corresponding thresholds may be specified by a set of event definitions for a scale group. For example, the scaling manager may monitor the average CPU or memory use of the VM instances 215 in group 210 over a specified time period. If the metrics exceed thresholds specified in the event definitions of a scaling group, then a scale out event occurs. As another example, the scaling manager may monitor a volume or rate network traffic received by the VMs 215 or number or frequency of new session requests distributed to VMs 215 by a load balancer. If the network traffic or session requests exceed a threshold specified in the event definitions for a scale group, the scaling manager triggers a scale out event.

In response to a scale-out event, the scaling manager may increase the number of VM instances 215 in scale group 210 using VM instances from the hotpool 105. That is, the scaling manager may add additional VM instances to the scale group 210 from the hotpool 105, rather than launching new VM instances. Because VM instances in the hotpool 105 are already booted, additional computing resources may become available to scale group 210 much more quickly, relative to launching new VM instances.

Although FIG. 2 illustrates a process where the scaling manager can automatically add VM instances 215 to group 210, the scaling manager may trigger a scale out event in response to a prompt issued by the user or administrator of the scale group 210 using the API 197 shown in FIG. 1. For example, the user may wish to improve the performance of the scale group 210 by adding additional VM instances to the group 210. To improve the responsiveness to such a request, the scaling manager may add a VM instance from the hotpool 105 to scale group 210, rather than launching a new instance. In one embodiment, the scaling manager outputs a graphical user interface (GUI) which can be used to instruct the scaling manager whether to retrieve a VM from the hotpool 105 or to launch a new VM, as well as specify event definitions, scaling polices, and configuration data for a scale group.

In one embodiment, the administrator of scale group 210 specifies whether the computing services or tasks performed by the VM instances 215 in the scale group 210 are compatible with the VM instances in the hotpool 105 or specify what instance types or guest operating systems are preferred for scaling the scale group 210. For example, the VM instances in the hotpool 105 may each include one operating system version or distribution but the computing services provided by scale group 210 might depend on another operating system version or distribution. In this example, the scaling manager generates a new VM instance when scale out events occur, rather than pulling a VM from the hotpool 105. However, in FIG. 2, it is assumed that VM instances in the hotpool 105 are compatible with the computing services provided by the VM instances 215 of scale group 210.

At block 203, in response to the scale out event, the scaling manager removes VM instance 220 from hotpool 105, as indicated by the ghosted lines. In one embodiment, the VM instances in the hotpool 105 managed by the service provider may include a flag or pointer that identifies a VM instance as being in the hotpool 105 or assigned to a scale group. To remove VM instance 220 from hotpool 105, the scaling manager changes the flag to indicate that this VM is assigned to scale group 210. As illustrated in block 204, VM instance 220 is added to scale group 210. The details of configuring VM instances retrieved from the hotpool 105 for use by a scale group 210 are discussed in detail below.

At block 205, the scaling manager triggers a scale in event indicating that one or more VM instances should be removed from scale group 210. In one embodiment, the scaling manager monitors metrics described above (e.g., CPU usage, memory usage, network activity, and the like) to determine when to trigger a scale in event, based on the event definitions of scale group 210. In one example, if a metric falls below a threshold specified in the event definitions for scale group 210, the scaling manager removes a VM instance from the scale group 210, based on a scaling policy associated with scale group 210. Of course, the thresholds used to trigger a scale out event at block 202 may be different than the thresholds used to trigger a scale in event at block 205. Moreover, the scaling manager may also remove a VM from the scale group 210 in response to a request from the administrator or according to predefined schedules.

In response to the scale in event, at block 206, the scaling manager removes VM instance 220 from scale group 210, as indicated by the ghosted lines. In one embodiment, the scaling manager may assign a higher priority to VM instances added to scale group 210 from the hotpool 105 over VM instances that were specifically launched and provisioned to be included in scale group 210. For example, if VMs 215 were launched in response to a request to generate scale group 210—i.e., VMs 215 were never in hotpool 105—the scaling manager may assign a lower priority to VM instances 215 when selecting instances to remove from scale group 210 in response to a scale in event. Conversely, the scaling manager may assign a higher priority to VM instance 220 (and to other VMs in scale group 210 pulled from the hotpool 105) for being removed from group 210 in response to a scale in event. One reason for doing so is that VM 220, which was originally in hotpool 105, may have characteristics that are suitable for other computing groups (e.g., a generic or stock operating system), while the user may have specifically configured VM instances 215 to provide the computing services corresponding to scale group 210 (e.g., the user may have modified the operating systems in VM instances 215 during a boot sequence, and as a result, the instances 215 are incompatible with computing services provided by other scale groups in a cloud environment).

At block 207, the scaling manager returns VM 220 to hotpool 105. In one embodiment, the scaling manager may perform one or more actions to restore the VM to a default configuration state before returning VM 220 to hotpool 105. For example, the computing service performed by scale group 210 may have had privileges to modify the guest operating system booted on VM 220 (e.g., stopped, modified, or changed services provided by the operating system).

Figure 4:
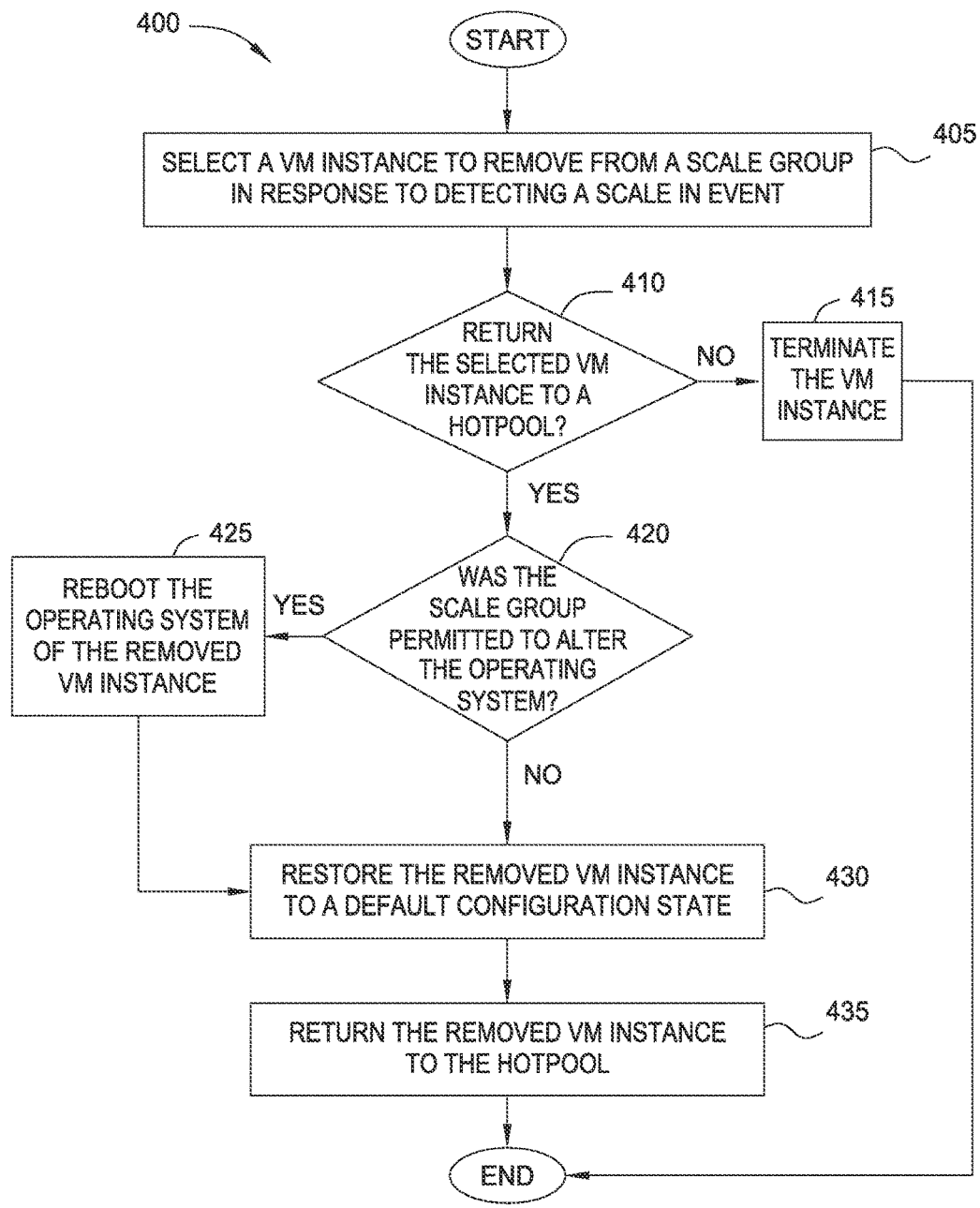
FIG. 4 illustrates a method for removing a virtual machine from a scale group, according to various embodiments.

In this case, the scaling manager may reboot the guest operating system before returning VM 220 to the hotpool 105. However, if a reboot is not performed, the scaling monitor may clear memory corresponding to VM instance 220 which contains customer specific data and unmount storage volumes mounted when VM instance 220 was added to scale group 210 (block 204) before returning the instance to hotpool 105. FIG. 4, discussed below, provides a more detailed description of removing VMs from a scale group.

The flow chart 200 then repeats at block 201. However, flow chart 200 should not be interpreted as precluding multiple scale in or scale out events from occurring sequentially. For example, the scaling manager may determine that the average CPU usage of the VMs 215 exceeds a predefined threshold and add VM 220 from hotpool 105 to scale group 210 which reduces the CPU usage below the threshold. Sometime later, if the scaling manager determines the CPU usage remains above the threshold, the manager may pull another VM from hotpool 105 and add this VM to the scale group 210 without an intervening scale in event occurring (i.e., without a VM being removed from the scale group 210). Similarly, a scaling policy may specify a change to a current size of a scale group 210 following a scale event as an absolute number of VM instances that should be in scale group 210, a number of VM instances to add or remove from the scale group 210, or a change to the number of VM instances in a scale group 210 based on a percentage of the current group size.

Figure 3:
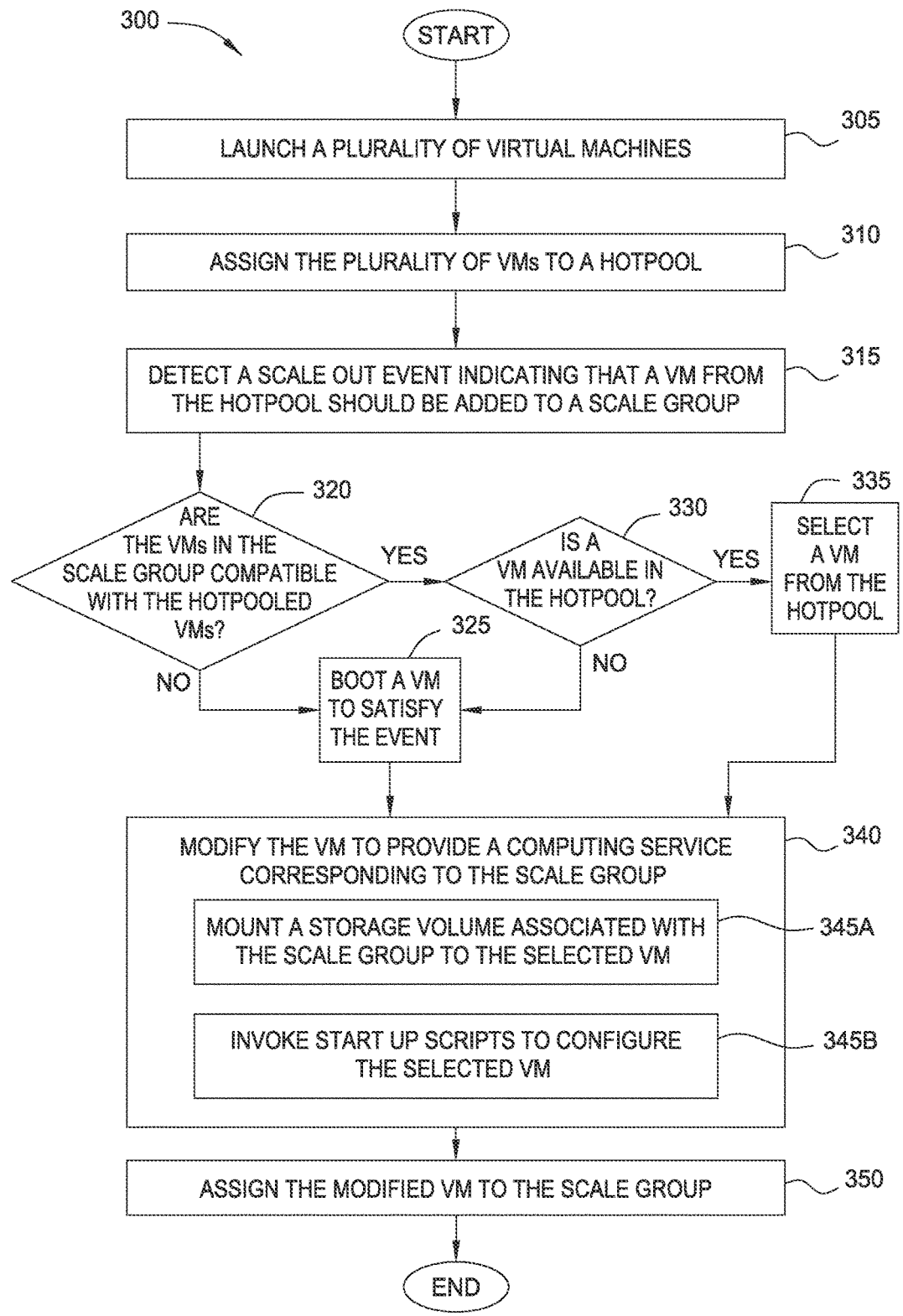
FIG. 3 illustrates a method for adding a virtual machine to a scale group, according to various embodiments.

FIG. 3 illustrates a method 300 to add a VM instance to a scale group, according to various embodiments. As shown, method 300 begins at block 305 where the hotpool manager configures and boots a collection of virtual machines to make available from the hotpool. In one embodiment, the hotpool manager launches VM instances that share at least one common attribute or trait (e.g., a same version of an operating system, same configuration of memory, CPU, storage, or networking capacities, etc.). At block 310, the hotpool manager assigns the collection of VMs launched at block 305 to the hotpool.

Additionally, the scaling manager may return VM instances to the hotpool in response to a scaling events which reduce the number of instances required by a scale group, as well as increase a count of VM instances in the hotpool to reflect predicted scaling needs across all the defined scale groups or when the number of booted VMs falls below a minimum count. As noted, the predicted needs and counts may be further subdivided based on instance types or guest operating system, etc.

At block 315, the scaling manager detects a scale out event indicating a need to add VM instances to a given scale group. As mentioned above, the scaling manager may monitor current metrics, add VM instances based on a user-defined schedule of the given scaling group, or receive a request to add a VM instance to the hotpool.

At block 320, the scaling manager determines whether VM instances in the hotpool are compatible for use by the requesting scale group. For example, the VMs in the hotpool may have been booted using a different of version or distribution of operating system than required by VM instances in the scale group. Or the scale group may require (or at least prefer) a virtual machine with a particular instance type (i.e., having a specific combination of CPU, memory, storage, or networking capacity) or that has components optimized for a particular purpose. Because VM instances in the hotpool are already booted and running, the scaling manager may be unable to reconfigure the configuration of these instances. In another example, an application on a VM instance in a scale group (or script used to configure a VM instance for a scale group) may require root access. If VM instances in the hotpool do not grant users with system level privileges, the instances in the hotpool are incompatible with such a scale group. In one embodiment, configuration data associated with the scale group may specify requirements for VM instances used to autoscale that scale group. As used herein, the configuration of a VM instance includes the services, applications, and guest operating system, as well as the configuration of the virtualized components of that instance, (i.e., different configurations of CPU, memory, storage, and networking resources on a virtual machine). In another embodiment, the scaling manager may evaluate the requirements of a scale group to ensure VM instances in the hotpool may be assigned to a given scale group.

If the service provided by the scale group is incompatible with VM instances from the hotpool, then at block 325 the scaling manager launches a new VM to satisfy the scale in event. In this case, the scaling manager launches a new VM with the particular instance type or operating system required by the scale group. In this manner, the service provider can still automatically scale the VMs in a scale group in response to scaling events.

Otherwise, if VM instances from the hotpool are compatible with the scale group, the scaling manager determines whether a VM instance is available in the hotpool (block 330). Depending on the current computing demands placed on the cloud environment, the instances in the hotpool may have been consumed by other scale groups. In other cases, VM instances in the hotpool may be reserved for higher priority scale groups. That is, the hotpool may have a reserve some number of VMs for high priority scale groups. In such cases, the scaling manager may elect to use VM instances from the hotpool, only if any priority requirements are satisfied. A scale groups may be assigned a priority based on a subscription fee, the importance of the tasks performed by the scale group, the total number of VM instances in the scale group, customer importance, and the like.

If a VM instance is not available in the hotpool, then the scaling manager launches a new VM to add to the scale group (block 325). Otherwise, when a VM instance is available, the scaling manager selects an instance from the hotpool to use in responding to a given scaling event.

In one embodiment, the scaling manager assigns temporary connectivity data to the VM instances in the hotpool. However, once an instance is removed from the hotpool and added to a scale group, the scaling manager replaces the temporary connectivity data may with data corresponding to the scale group. For example, when booting and assigning a VM instance to the hotpool, the scaling manager may assign a local DNS mapping or IP address to the instance. The scaling manager can change the assigned DNS mapping and IP address when allocating the VM to a particular scale group. In one embodiment, the DNS and IP address values are changed from internal values used by the provider to manage VMs in the pool to values specified by the configuration data of the particular scaling group.

At block 340, the scaling manager modifies the selected VM instance as needed to be a member of the particular scale group (i.e., to provide the computing service corresponding to the scale group). To do so, at block 345A the scaling manager mounts one or more storage volumes associated with the scale group to the VM. Each storage volume may provide a persistent storage block for a scale group independently from any of the running VM instances in that group. The storage volume may contain the applications and data used by the scale group to provide a scalable computing service. In one embodiment, some VM instances in a scale group may mount the same storage volume (e.g., a read-only volume storing applications). A VM instance being added to a scaling group can also mount storage volumes used only by that instance (e.g., a storage volume written to by a database application on the VM instance).

At block 345B, the scaling manager invokes one or more start-up scripts to provision the selected instance. For example, the scripts may start applications or services executing on the VM instance so that these applications can perform the computing service corresponding to the scale group. As noted above, a user may define configuration data for a scaling group so that when a new VM is added to that scale group (either by launching a new VM or adding a VM from the hotpool) the start-up scripts are executed. In another example, the start-up scripts may be stored on the storage volumes corresponding to the scale group. Once a storage volume is mounted to the file system of the VM instance, the startup scripts can launch applications (e.g., a web server) as well as access configuration files needed by such applications (e.g., an httpd.conf file).

At block 350, the VM instance is assigned to the scale group and begins to perform the computing services corresponding to the scale group—e.g., providing a web service, archiving data, streaming media, and the like.

FIG. 4 illustrates a method 400 for removing a VM from a scale group, according to various embodiments. As shown, the method 400 begins when the scaling manager detects a scale in event indicating that one or more VM instances should be removed from a given scale group. As mentioned above, the scaling manager may monitor metrics and corresponding thresholds, follow predefined schedules, or receive an express request to remove a VM instance from the scale group. In each case, the scaling manager responds by selecting one or more VM instances to remove from the scale group (block 405).

At block 410, the scaling manager determines whether the selected instance can be returned to the hotpool. That is, the scaling manager determines whether the selected instance satisfies any requirements or characteristics needed by VM instances in the hotpool. In one embodiment, the scaling manager may prioritize which instance to remove from a scale group to preferentially pull VM instances that can be returned to the hotpool. That is, VM instances added to the scale group from the hotpool may have a higher priority than instances launched (and potentially customized) for the purpose of being added to the scale group. In some cases, such VM instances may not match the configuration of the instances in the hotpool. By giving a higher priority to instances which originated in the hotpool, the scaling manager can first reduce the computing capacity of a scaling group by removing VM instances that can be returned to the hotpool and made available to other scale groups.

If the selected VM instance cannot be assigned to the hotpool, the instance is terminated—i.e., shut down (block 415). Doing so frees the physical computer hardware (e.g., CPUs, memory, GPU, etc.) assigned to the now terminated VM instance.

If the selected VM instance can be returned to the hotpool, the scaling manager determines whether the user was permitted to alter the operating system (block 420). For example, the scaling manager determines whether the user was given root access on VM instances booted using a Linux® distribution. For example, the service provider may guarantee that the operating systems in the VM in the hotpool have a certain base configuration or core service package. Based on this knowledge, users can develop applications that are compatible with the VM instances in the hotpool. However, users (and their applications) may be granted privileges to modify the base configuration or core service package. In such cases, the scaling manager reboots the removed VM instance before returning it to the hotpool (block 425).

In other cases, the scale group may not have the necessary privileges to modify the operating system or core services of a VM instance that were executing when the instance was booted and added the hotpool. In such cases, the scaling manager can add the removed VM to the hotpool at block 430 without rebooting the VM instance. Instead, the scaling manager may unmount any storage volumes mounted by the scale group and terminate any user processes or services. Furthermore, the scaling manager may clear local memory to ensure that any data associated with the scale group has been removed (e.g., passwords, confidential information, processed data, etc.). In one embodiment, the scaling manager determines whether to add the removed VM directly to the hotpool without rebooting depending on which scale group the VM was removed from. For example, some scale groups may be controlled by the service provider, and thus, the service provider has greater control over the applications executed by those scale groups than applications executed by customer scale groups. The service provider can ensure that the applications in its scale groups do not alter the operating system, and thus, VM instances removed from such scale groups can be directly added to the hotpool (block 430). However, when VM instances are removed from customer scale groups, the scaling manager may reboot the operating systems at block 425 before adding the instances to the hotpool 430. By avoiding block 425, the selected VMs can be returned to the hotpool more quickly, and thus, be available sooner for other scale groups. Furthermore, in one embodiment, the service provider may offer incentives to customers who structure their applications to not require system level privileges, and thus, VMs removed from such scale groups can be returned to the hotpool without first being rebooting to a default configuration state.

At block 435, the scaling manager returns the removed VM to the hotpool. In one embodiment, the scaling manager may clear memory corresponding to the removed VM or unmount any instance based storage volumes before the VM is placed in the hotpool.

Figure 5:
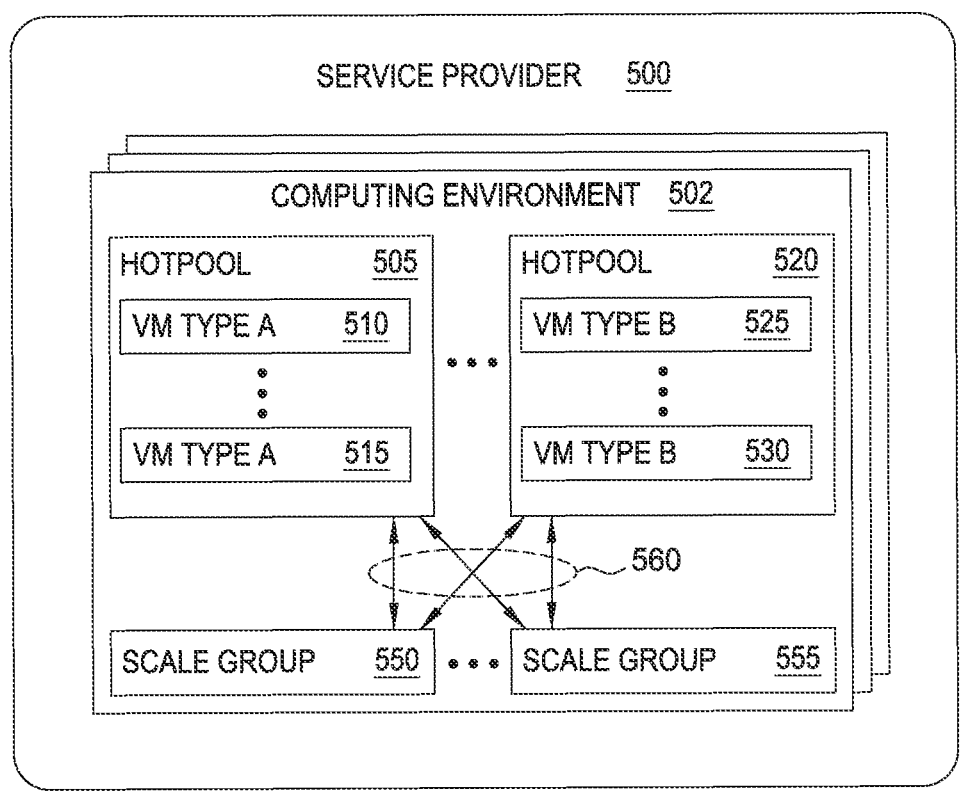
FIG. 5 illustrates multiple hotpools of booted virtual machines, according to various embodiments.

FIG. 5 illustrates an example of a service provider 500 with a plurality of hotpools with different types of virtual machines in accordance with various embodiments. Although service provider 500 includes hotpools 505 and 520, the service provider 500 may include any number of hotpools in a computing environment 502 (e.g., data center, geographic region, availability zones, etc.). Hotpool 505 includes one type of VM instance (e.g., VM type A 510 and VM type A 515) while hotpool 520 includes a different type of VM instance (e.g., VM type B 525 and VM type B 530). That is, the VM instances in hotpool 505 have a configuration that is different from a configuration of VM instances in hotpool 520. For example, VM instances in hotpool 505 may have a different operating system than VM instances in hotpool 520—e.g., instances 510 and 515 may include a version of a Windows® operating system while VM instances 525 and 530 include a version of a Linux® distribution. Alternatively, the VM instances in hotpools 505 and 520 may be the same type of operating system but different distributions or versions.

In other examples, the VM instances in hotpools 505 and 520 may have different configurations of CPU, memory, storage, and networking resources—e.g., the instances in hotpool 505 include a GPU while the instances in hotpool 520 do not—or different performance standards—e.g., hotpool 505 is a high performance hotpool where the instances have more CPUs and memory than the VM instances in hotpool 520. Furthermore, service provider 500 may manage hotpools for the computing environments 502 differently. As an example, hotpool 505 could contain VM instances executing on computing systems located in the United States while hotpool 520 contains instances executing on computing systems located in Europe. Further, a scale group 550 in one computing environment 502 may pull a VM instance from a hotpool in another computing environment 502. For example, if no VMs are available in hotpools 505 and 520, scale groups 550 or 555 may send a request for a VM in a hotpool in another one of the computing environments 502 in the service provider 500. Moreover, it may be advantageous for a scale group to include VMs in different computing environments 502. For example, if the scale groups 550 and 555 include VMs in different availability zones and one of the zones fails, the VMs located in the other zones can continue to perform the tasks associated with the scale groups 550, 555.

Note however, FIG. 5 illustrates two hotpools for clarity and ease of explanation. In other embodiments, the service provider 100 may have only one hotpool that includes VM instances with different VM instance types. For example, VM type A 510 and VM type B 525 may be assigned to the same hotpool. Before pulling a VM instance from the hotpool in response to a scaling event, the scaling manager may check to identify whether the VM is compatible with the corresponding scale group—i.e., determines which of VM instance types in the hotpool are compatible with the scale group.

As shown, VM instances have been included in two scale groups—scale groups 550 and 555. As indicated by arrows 560, the scaling manager may assign VMs from hotpools 505 and 520 to scale group 550 or scale group 555. For example, the computing service performed by user group 550 may be compatible with the VMs in both hotpool 505 and hotpool 520. Thus, the scaling manager may add VM instances to scale group 550 from hotpool 505 or hotpool 520, in response to scale out events. In another example, the service provider may specify an order or priority for different hotpools, e.g., to first select VM instances from hotpool 505, if available, and if not, then select a VM from hotpool 520. In such a case, when the scaling manager begins pulling VM instances from hotpool 520, the hotpool manager may replenish hotpool 505 by booting additional VM instances. FIG. 5 illustrates that each hotpool may be used by multiple different scale groups to add additional computing resources when a scale out event occurs. Alternatively however, a scale group may require VM instances from a specific hotpool (or a subset of the hotpools).

After detecting a scale in event, the scaling manager may return a VM removed from the scale group to one of the hotpools (assuming the VM being returned has a configuration compatible with one of the hotpools). The scaling manager may select which hotpool to return a VM to based on need (e.g., which hotpool has the fewest number of VMs), compatibility (e.g., which hotpool contains instances with the most attributes in common with the removed instance), or based on which hotpool the instance originated from.

Figure 6:
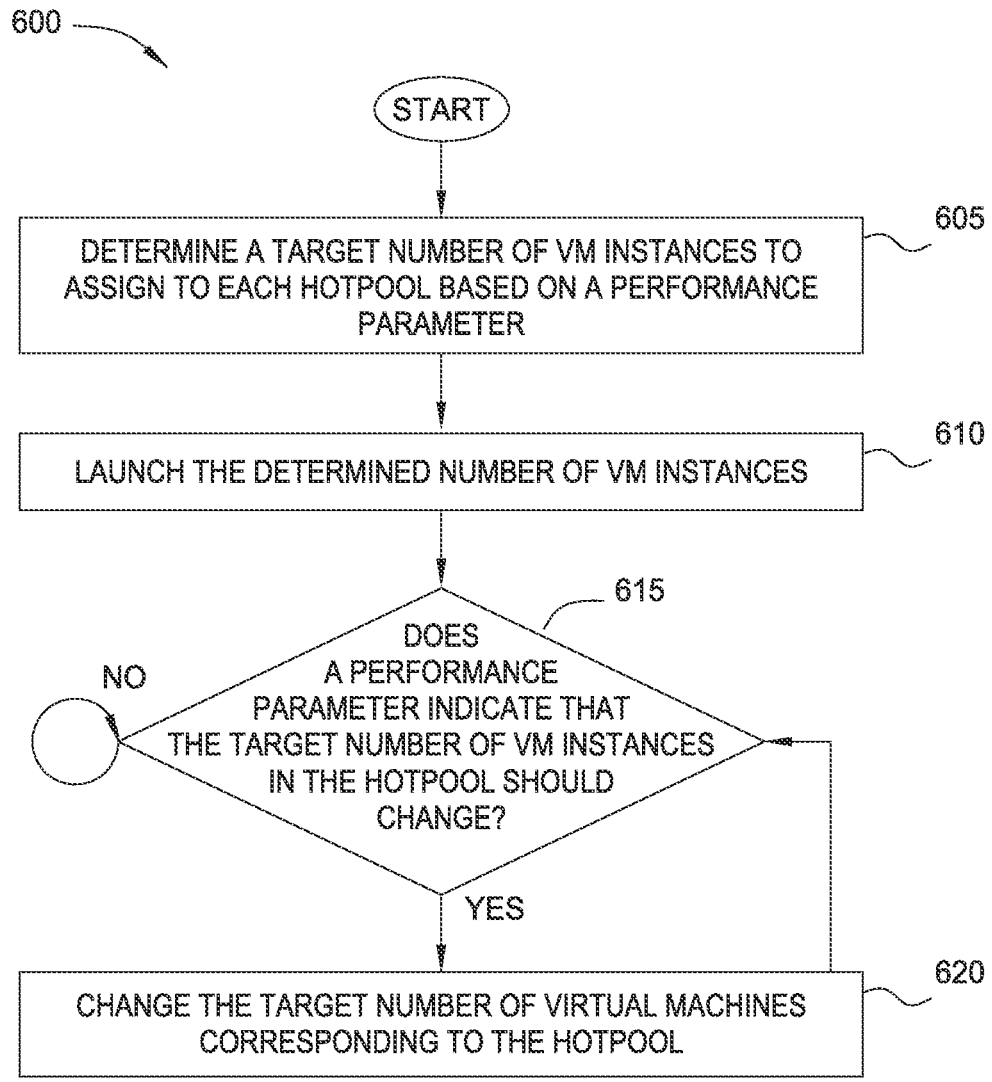
FIG. 6 illustrates a method for managing the number of virtual machine instances in a hotpool, according to various embodiments.

FIG. 6 illustrates a method 600 for managing the number of VM instances in a hotpool, according to one embodiment. As shown, the method 600 begins at block 605 where the hotpool manager determines a target number of VM instances to boot and populate in one or more hotpools. To do so, the hotpool manager can evaluate a variety of available performance parameters in order to dynamically manage the target number of VM instances that should be available in a given hotpool. These performance parameters may include one or more indicators of future demand for VM instances in the hotpool, cost of operating the physical computing resources, availability of computing resources in the computing environment, redundancy between computing environments, and the like. By evaluating these parameters, the hotpool manager may assign a different target number of booted VM instances to the hotpools.

Indicators of future demand may include time of day, user-specified schedules, history, or popularity of a particular type of VM instance or operating system. For example, an administrator may determine that one VM instance type or configuration will be in greater demand than others, and boot more instances of such instances relative to other instance types. Demand indicators may be also based on the number of scale groups that use a given VM instance type or configuration to scale. For example, if more scale groups rely on VM instances booted using Operating System A than Operating System B, the hotpool manager may include more VM instances in the hotpool that includes instances with Operating System A than a hotpool that includes instances with Operating System B. As another example, an indicator of future demand may be based on historical patterns of scale groups in scaling out (adding VM instances) and scaling in (removing VM instances). The hotpool manager may then determine which, and how many, VM instances to boot and add to a pool. Additionally, the hotpool manager may evaluate user-specified schedules for scaling a given scale group to estimate how many VM instances to boot and add to each of the hotpools. These schedules may change based on the time of day, holidays, work stoppages, and the like.

Another indicator of future demand may be the amount computing resources or number of scale groups in a particular computing environment—e.g. a physical data center, a cluster of computing systems, a geographic region, or an availability zone. As the amount of computing resources or number of scale groups in a computing environment increases, the hotpool manager may launch greater numbers of VM instances. That is, the amount of computing resources and number of scale groups may be used as an indicator to estimate the future demand for VM instances from one or more hotpools servicing the computing environment.

In one embodiment, the hotpool manager monitors a change in the cost of operating the physical computing resources hosting the VMs in the hotpool in order to determine the target number of VMs for the hotpool. Generally, the higher the monetary cost of maintaining the booted VMs, the lower the target number of VMs in the pool. Non-limiting examples of operating costs include electricity costs for operating the computing resources hosting the VMs, replacement costs from the wear and tear on the computing resources that host the VMs in a hotpool, environmental costs from cooling the computing resources hosting the VMs in the hotpool, or infrastructure costs for ensuring a computing environment includes extra available computing resource for hosting the VMs in a hotpool.

In one embodiment, the hotpool manager determines the availability of computing resources in a computing environment in order to set the target number of VMs in the hotpool. For example, the hotpool manager may include a set of thresholds corresponding to different amounts of available or unused computing resources in a data center. Depending on which threshold is satisfied determines the target number of VMs for the hotpool.

In one embodiment, the hotpool manager considers a combination of the performance parameters described above to determine the target number of VMs. For instance, even if the cost of electricity is relatively high, the hotpool manager may nonetheless boot a large number of VMs for the hotpool if the VM are predicted to be in high demand. In one example, the hotpool manager includes logic for weighting the different performance parameters to determine the target number of VMs for a hotpool.

At block 610, the hotpool manager launches VM instances to add to the hotpools based on evaluating the performance parameters described at block 605. As noted, some VM instances (or hotpools) may share certain configuration attributes in common (e.g., a common version of an operating system, or common CPUs, memory, storage, or networking capabilities). Alternatively, some instances (or hotpools) may be configured with specific hardware or resource characteristics, different operating regions, different operating systems or versions, and the like.

Once launched, the hotpool manager assigns each VM instance to a hotpool. As discussed above, the scaling manager may then use the hotpools to select a VM instance to add to a particular scale group in response to a scaling events, failover events, or shifting events.

At block 615, the hotpool manager dynamically monitors the performance parameters to determine whether the target number of VM instances in a hotpool should change. That is, the performance parameters may have changed relative to the when the target number of the hotpool was determined at block 605, thereby indicating that this target should be adjusted. For example, if the workload for a scale group increases during business hours (indicating that the scale group is more likely to trigger a scale out event), the hotpool manager may increase the target number of VMs for the hotpool. Or if a customer is about shut down for a holiday which is likely to reduce the workload on its scale group, the hotpool manager may decrease the target number of VMs for the hotpool(s) most often used by the customer's scale groups. Further, the different computing environments may be located in different time zones, and as such, the hotpool manager may scale the hotpools in the computing environment individually based on the local time of the computing environment.

In other examples, the popularity of the type of VM instances stored in the hotpool may have decreased over time or the cost of operating the computing resources may have increased. Thus, the same parameters used to determine the initial target number for the hotpool may also be monitored at block 615 to adjust the target number of VMs in the hotpool based on changing circumstances.

The hotpool manager may also adjust the target number of instances in a hotpool based on a performance parameter indicating actual demand for the VM instances in the hotpool. For example, when an unexpected demand for VM instances from a hotpool occurs, the service provider could replenish a hotpool with additional VM instances once reaching a minimum. Conversely, the hotpool manager could shut down VM instances in a hotpool if actual demand for VM instances from the pool falls short of expected demand. As another example, a performance parameter may be derived from trends or patterns identified by evaluating historical data. If requests for VM instances in a hotpool are greater during a particular time period, the hotpool manager may adjust the target number of booted VMs assigned to the hotpool accordingly. For example, during a holiday, the hotpool manager may increase the target number of VMs in a hotpool to reduce the likelihood the hotpool will be unable to satisfy scale group demand. Or the hotpool manager may increase the target number of VMs of a hotpool during business hours and reduce the target number during nighttime. At block 620, the hotpool manager adjusts the target number of VMs corresponding to the hotpool based on monitoring the performance parameters.

Figure 7:
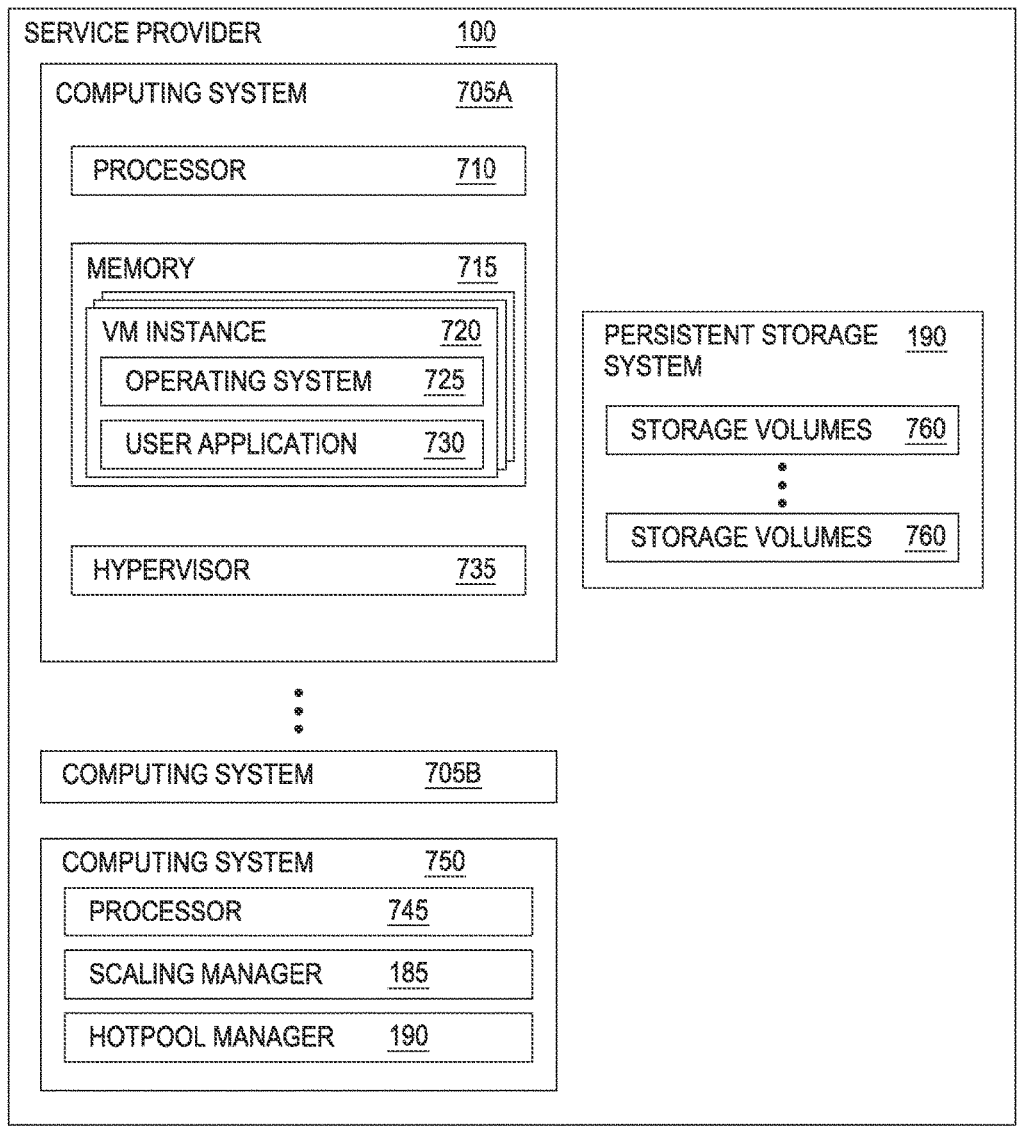
FIG. 7 is a block diagram of computing systems deployed by a service provider, according to various embodiments.

FIG. 7 is a block diagram of computing systems 705 deployed by service provider 100, according to various embodiments. As shown, service provider 100 includes a set of computing system 705, each hosting a set of VM instances 720. Each computing system 705 includes a processor 710, memory 715, and hypervisor 735. Processor 710 is intended to be representative of a single CPU, multiple CPUs, a single CPU having multiple processing cores, and the like. And the memory 710 is included to be representative of a random access memory. As shown, memory 715 includes one or more VM instances 720 which each include an operating system 725 executing on the virtualized computing hardware exposed to the operating system by hypervisor 735. Each VM instance 720 also includes a set of user applications 730, which perform the computing service or services provided by a particular scale group—e.g., providing a web service, archiving data, streaming media, and the like.

Although shown in memory 715, applications 730 may be stored in storage volumes 760 mounted to VM instances 720 (or loaded into the memory of a VM instance from a storage volume). VM instances 720 in computing systems 705A could be part of a hotpool or have been pulled from the hotpool to provide additional computing capacity to a scaling group. Storage volumes 760 are part of persistent storage system 190. Storage volumes 760 each provide a raw block device that may be mounted to the file system of one of the VM instances 720. Each storage volume 760 stores applications and/or data for an enterprise using VM instances 720 of the service provider 100 to provide the computing service of a scale group. Storage volumes 760 preserve applications and data both when computing system 705A is powered down and when VM instances 720 are shutdown, terminated, or become unresponsive.

The hypervisor 735 is computer software, firmware or hardware that creates and runs the VM instances 720 on the computing systems 705. Generally, hypervisor 735 coordinates access and communication between VM instances 720 and the hardware elements of the computing system 705. That is, hypervisor 735 exposes the physical hardware resources (e.g., processors 710, memory 715, and network and storage resources) to the guest environment of VM instances 720.

Illustratively, service provider 100 also includes computing system 750 which contains a processor 745, scaling manager 185 and hotpool manager 190. As discussed above, scaling manager 185 and hotpool manager 190 may provide software applications used to manage a hotpool of VM instances available to rapidly supply scale groups with additional computing capacity. Although shown as being part of service provider 100, in other embodiments, scaling manager 185 and hotpool manager 190 may be located on a remote computer system outside of the service provider 100.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A computer-readable storage medium storing computer-readable program code which, when executed on a processor, performs an operation, the operation comprising:
    launching a first plurality of virtual machines, wherein each virtual machine provides a virtualized computing platform hosting an operating system;
    assigning the first plurality of virtual machines to a pool of virtual machines available to a plurality of scale groups, each of the scale groups is associated with a respective computing service provided by a respective second plurality of operating virtual machines assigned to each of the scale groups;
    detecting a scaling event corresponding to a first group of the plurality of scale groups;
    selecting, in response to detecting the scaling event, one of the first plurality of virtual machines assigned to the pool;
    mounting a persistent storage volume associated with the first group to the selected virtual machine;
    invoking a script associated with the computing service associated with the first group in response to mounting the persistent storage volume which stores the script, wherein the script modifies the selected virtual machine according to a predefined configuration for the first group to provide the computing service;
    assigning the selected virtual machine to the first group; and
    in response to detecting a scaling event corresponding to a second group of the plurality of scale groups:
        determining that a priority assigned to the second group does not satisfy a priority requirement corresponding to the pool of virtual machines, wherein the priority of the second group is based on at least one of a subscription fee, an importance of tasks performed by the second group, and a customer importance, and
        launching a new virtual machine to be assigned to the second group instead of using the pool of virtual machines.

2. The computer-readable storage medium of claim 1, wherein the operation further comprises:
    selecting, in response to detecting another scaling event corresponding to the first group, a first virtual machine assigned to the first group which was previously assigned to the pool;
    restoring a state of the first virtual machine to a default configuration state shared by the first plurality of virtual machines; and
    returning the first virtual machine to the pool after the first virtual machine is in the default configuration state.

3. The computer-readable storage medium of claim 1, wherein the operation further comprises:
    selecting, in response to detecting another scaling event corresponding to the first group, a first virtual machine assigned to the first group which was previously assigned to the pool;
    upon determining that the computing service associated with the first group was permitted to alter a guest operating system of the first virtual machine, rebooting the guest operating system of the first virtual machine before adding the first virtual machine to the pool, and
    wherein, upon determining that the computing service associated with the first group was not permitted to alter the guest operating system of the first virtual machine, returning the first virtual machine to the pool without rebooting the guest operating system of the first virtual machine.

4. The computer-readable storage medium of claim 1, wherein the operation further comprises:
    prior to selecting one of the first plurality of virtual machines assigned to the pool, determining whether the computing service associated with the first group is compatible with a software module in the selected virtual machine, wherein the software module comprises at least one of an operating system executing in the selected virtual machine and an application stored in the selected virtual machine; and upon determining the computing service associated with the first group is incompatible with the software module in the selected virtual machine, launching a new virtual machine to be assigned to the first group, wherein, upon determining the computing service associated with the first group is compatible with the software module in the selected virtual machine, the selected virtual machine is assigned to the first group.

5. The computer-readable storage medium of claim 1, wherein modifying the selected virtual machine further comprises:

launching an application from the mounted storage volume on the selected virtual machine to provide the computing service associated with the first group.

6. A system, comprising:

one or more computer processors; and one or more memories containing a program which, when executed on the one or more computer processors, performs an operation for managing virtual computing resources assigned to a plurality of computing groups, the operation comprising:

in response to determining an occurrence of a predefined event corresponding to a first group of the plurality of computing groups:

determining that a computing service associated with the first group is compatible with a software module in a virtual machine in a pool of booted virtual machines, modifying, after determining the computing service is compatible with the virtual machine, the software module of the virtual machine assigned to the booted virtual machines to provide the computing service associated with the first group, wherein the booted virtual machines are available for assignment to any one of the plurality of computing groups, and adding the virtual machine to the first group;

in response to determining an occurrence of the predefined event corresponding to a second group of the plurality of computing groups:

determining that a priority assigned to the second group does not satisfy a priority requirement corresponding to the pool of booted virtual machines, wherein the priority of the second group is based on at least one of a subscription fee, an importance of tasks performed by the second group, and a customer importance, and launching a new virtual machine to be assigned to the second group instead of using the pool of booted virtual machines.

7. The system of claim 6, wherein modifying the software module of the virtual machine comprises:

invoking a script associated with the computing service associated with the first group, wherein the script modifies the virtual machine such that the virtual machine performs the computing service associated with the first group, wherein the software module comprises at least one of an operating system executing in the virtual machine and an application stored in the virtual machine, wherein each of the booted virtual machines contains a respective copy of the software module.

8. The system of claim 6, wherein the operation further comprises:

determining a number of virtual machines to launch and assign to the pool based on an indicator of future demand for scalable computing resources by the plurality of computing groups.

9. The system of claim 8, wherein the indicator of future demand is derived from historical data corresponding to past demand for computing resources by the plurality of computing groups.

10. The system of claim 6, wherein determining that the computing service is compatible with the virtual machine comprises determining whether an operating system version of the booted virtual machines is compatible with the computing service, wherein the operation further comprises:

in response to determining an occurrence of the predefined event corresponding to the second group of the plurality of computing groups:

determining that a different computing service corresponding to the second group is incompatible with the booted virtual machines, and launching the new virtual machine to be assigned to the second group after determining the different computing service is incompatible with the booted virtual machines.

11. The system of claim 6, wherein the operation further comprises:

selecting, in response to detecting another scaling event corresponding to the first group, a first virtual machine from one or more virtual machines in the first group which was previously assigned to the pool;

restoring a state of the first virtual machine to a default configuration state shared by the booted virtual machines; and returning the first virtual machine to the pool after the first virtual machine is in the default configuration state.

12. The system of claim 6, wherein the pool is one of a plurality of pools, wherein each of the plurality of pools comprises a plurality of booted virtual machines available to be assigned to one or more of the plurality of scale groups, and wherein the each of the plurality of pools corresponds to a distinct virtual machine type.

13. The system of claim 12, wherein each of the distinct virtual machine types comprises one of a different operating system and a different version of a shared operating system relative to the other distinct virtual machine types.

14. A method, comprising:

assigning a first plurality of booted virtual machines to a pool of virtual machines available to a plurality of computing groups, each of the computing groups is associated with a respective computing service provided by a respective second plurality of operating virtual machines assigned to each of the computing groups; and in response to determining an occurrence of a predefined event associated with a first group of the plurality of computing groups:

determining that a computing service associated with the first group is compatible with a software module in a first virtual machine in the booted virtual machines, modifying, after determining the computing service is compatible with the first virtual machine, the software module of the first virtual machine assigned to the pool to provide the computing service associated with the first group, and adding the first virtual machine to the first group;

in response to determining an occurrence of the predefined event corresponding to a second group of the plurality of computing groups:

determining that a priority assigned to the second group does not satisfy a priority requirement corresponding to the pool of booted virtual machines, wherein the priority of the second group is based on at least one of a subscription fee, an importance of tasks performed by the second group, and a customer importance, and launching a new virtual machine to be assigned to the second group instead of using the pool of booted virtual machines.

15. The method of claim 14, wherein modifying the software module of the first virtual machine further comprises:

invoking a script associated with the computing service associated with the first group, wherein the script modifies the virtual machine such that the virtual machines performs the computing service associated with the first group, wherein the software module comprises at least one of an operating system executing in the virtual machine and an application stored in the virtual machine, wherein each of the booted virtual machines contains a respective copy of the software module.

16. The method of claim 14, wherein assigning a first plurality of booted virtual machines to a pool comprises:

determining a number of virtual machines to launch and assign to the pool based on an indicator of future demand for computing resources by the plurality of computing groups.

17. The method of claim 16, wherein the indicator of future demand is derived from historical data corresponding to past demand for scalable computing resources by the plurality of computing groups.

18. The method of claim 14, wherein determining that the computing service is compatible with the virtual machine comprises determining whether an operating system version of the booted virtual machines is compatible with the computing service, the method further comprising:

in response to determining an occurrence of the predefined event corresponding to the second group of the plurality of computing groups:

determining that a different computing service associated with the second group is incompatible with the first plurality of virtual machines, and launching the new virtual machine to be assigned to the second group.

19. The method of claim 14, further comprising:

selecting, in response to detecting another scaling event corresponding to the first group, a second virtual machine assigned to the first group which was previously assigned to the pool;

restoring a state of the second virtual machine to a default configuration state shared by the first plurality of virtual machines; and returning the second virtual machine to the pool after the second virtual machine is in the default configuration state.

20. The method of claim 14, wherein the pool is one of a plurality of pools, wherein each of the plurality of pools comprises a plurality of booted virtual machines which are available to be assigned to one or more of the plurality of scale groups, and wherein the each of the plurality of pools corresponds to a distinct virtual machine type.

21. The method of claim 20, wherein each of the distinct virtual machine types comprises one of: a different operating system and a different version of a shared operating system relative to the other distinct virtual machine types.

* * * * *